US006084928A

United States Patent [19]
Kuwahara

[11] Patent Number: 6,084,928
[45] Date of Patent: Jul. 4, 2000

[54] RADIO ENVIRONMENT ANALYSIS APPARATUS

[75] Inventor: Yoshihiko Kuwahara, Tokyo, Japan

[73] Assignee: NEC Corporation, Tokyo, Japan

[21] Appl. No.: 09/323,782

[22] Filed: Jun. 1, 1999

[30] Foreign Application Priority Data

Jun. 2, 1998 [JP] Japan .................................. 10-152629

[51] Int. Cl.$^7$ ................................. H04B 7/10; H04L 1/02
[52] U.S. Cl. ........................ 375/347; 375/148; 342/147
[58] Field of Search ..................................... 375/144, 148,
  375/347, 367; 342/147, 157, 158, 194,
  196, 195, 417, 434, 437, 443

[56] References Cited

U.S. PATENT DOCUMENTS

| 4,965,732 | 10/1990 | Roy, III et al. ......................... 342/147 |
| 5,930,243 | 7/1999 | Parish et al. ............................. 370/334 |

FOREIGN PATENT DOCUMENTS

| 4-76466 | 3/1992 | Japan . |
| 6-338849 | 12/1994 | Japan . |
| 8-65743 | 3/1996 | Japan . |
| 8-278359 | 10/1996 | Japan . |

OTHER PUBLICATIONS

"High–Resolution Analysis of indoor Multipath Propagation Structure", IEICE Trans. Commun., vol. E78–B, No. 11, pp. 1450–1457, Nov. 1995.

"Estimation of Propagation Delay Time and Direction of Arrival of Indoor Quasi–Millimeter Multipath Waves Using FFT–Music with Triangular Antenna Array", Technical Report of IEICE, A•P95–120, pp. 79–84, Feb. 1996.

"High–Resolution 3–D Direction–of–Arrival Determination for Urban Mobile Radio", IEEE Transactions on Antenna and Propagation, vol. 45, No. 4, Apr. 1997, pp. 672–682.

"Paired Estimation of Propagation Delay Times and Directions of Arrival of Multipath Waves Using 2D Unitary Esprit", Technical Report of IEICE, A•P97–78, Jul. 1997, pp. 53–60.

*Primary Examiner*—Don N. Vo
*Assistant Examiner*—Phuong Phu
*Attorney, Agent, or Firm*—Ostrolenk, Faber, Gerb & Soffen, LLP

[57] ABSTRACT

A radio environment analysis apparatus includes a receiver and signal processor. The receiver receives a signal modulated by phase shift keying (PSK) using a pseudo noise (PN) code sequence by an array antenna at a plurality of fixed points on the plane, converts the received signals into intermediate frequencies or demodulated signals, and outputs them. The signal processor processes a signal output from the receiver to analyze the arrival angle, delay time, and relative power of the signal incoming to the receiver. The signal processor has a plurality of normalization units, first estimation unit, arithmetic unit, and second estimation unit. The normalization units individually normalize signals from the receiver and output them as a normalized signal group. The first estimation unit calculates a covariance matrix, and estimates the arrival angle of each incoming signal. The arithmetic unit calculates a weight of the array antenna for suppressing incoming signals except for an incoming signal having the estimated arrival angle, and calculates the product of the weight of the array antenna and the normalized signal group. The second estimation unit calculates a covariance matrix and estimates the delay time and relative power.

7 Claims, 6 Drawing Sheets

$\bar{S} = S'_1 + S'_2 + S'_3 + S'_4$

S : ORIGINAL CORRELATION MATRIX
$\bar{S}$ : CORRELATION MATRIX AFTER MOVING AVERAGING

RADIO ENVIRONMENT ANALYSIS APPARATUS

BACKGROUND OF THE INVENTION

The present invention relates to a radio environment analysis apparatus and, more particularly, to a radio environment analysis apparatus for measuring the arrival angle, delay time, and relative power of a signal incoming to the antenna in a multipath environment such as an urban or indoor space.

To realize high-speed digital communication, frequency resources must be effectively used. Many studies have been made for techniques such as a method using the milliwave band where a wide band is essentially ensured from a specific band, a method of reducing a repetitively used frequency with a decrease in cell area, and dynamic zone control effectively using adjacent cell base stations in accordance with the number of users.

As the communication speed increases, interference between multipath codes occurs to decrease the communication quality in an environment such as an urban or indoor space. When the cell area decreases, interference in the same channel occurs.

One of effective means for removing interference between multipath codes and interference in the same channel is to introduce an adaptive antenna effective for removing a long delayed wave and an adaptive equalizer effective for removing a short delayed wave. In this case, to effectively operate the adaptive antenna and adaptive equalizer, the arrival angle and delay time of a signal incoming to the antenna must be measured. Also in dynamic zone control, particularly the arrival angle of a signal incoming to the antenna must be measured for beam control of the antenna.

Known examples of an algorithm of measuring the arrival angle, delay time, and relative power of a signal incoming to the antenna in the multipath environment are a 2D-MUSIC method, FFT-MUSIC method, and 2D-Unitary ESPRIT method.

Evaluation of the indoor propagation environment by the 2D-MUSIC method is reported in "High-Resolution Analysis of Indoor Multipath Propagation Structure", IEICE TRANS. COMMUN., VOL. E78-B, NO. 11, pp. 1450–1457, NOVEMBER 1995 (reference 1).

The principle of the FFT-MUSIC method is described in "Estimation of Propagation Delay Time and Direction of Arrival of Indoor Quasi-Millimeter Multipath Waves Using FFT-MUSIC with Triangular Antenna Array", TECHNICAL REPORT OF IEICE, A•P95-120, pp. 79–84, February 1996 (reference 2).

Evaluation of propagation characteristics in the urban space using the 2D-Unitary ESPRIT method is described in "High-Resolution 3-D Direction-of-Arrival Determination for Urban Mobile Radio", IEEE TRANSACTIONS ON ANTENNAS AND PROPAGATION, VOL. 45, NO. 4, APRIL 1997 (reference 3).

The principle of simultaneously estimating a combination of the arrival angle and delay time of a signal incoming to the antenna is described in "Paired Estimation of Propagation Delay Times and Directions of Arrival of Multipath Waves Using 2D Unitary ESPRIT", TECHNICAL REPORT OF IEICE, A•P97-78, JULY 1997 (reference 4).

However, these conventional methods of estimating the arrival angle and delay time of a signal incoming to the antenna suffer the following problems.

First, the 2D-MUSIC method in reference 1 and the 2D-Unitary ESPRIT method in reference 4 can estimate only the azimuth plane of the arrival angle and cannot estimate the elevation plane. At present, since a mobile telephone base station in operation controls the elevation plane directivity of the antenna in accordance with the situation, the azimuth and elevation planes of the arrival angle must be simultaneously grasped.

Second, the position of a reception antenna element is mechanically moved for measurement. This is also the same in the 2D-Unitary ESPRIT method in reference 3. The mechanical movement of the reception antenna increases the measurement time. Considering mobile communication, the antenna and equalizer must be controlled in real time, so these methods are difficult to apply to mobile communication.

Third, since a reception signal is normalized using a transmission signal as a reference, the transmission signal must be supplied to the receiver via a cable. Connecting communication stations by the cable essentially contradicts mobile communication.

To the contrary, the FFT-MUSIC method in reference 2 can simultaneously estimate the arrival angles of azimuth and elevation planes and the delay time without requiring any mechanical movement of the reception antenna and any connection cable between communication stations. However, this method does not resolve the arrival angle by a superresolution technique, resulting in low angle resolution and low precision. In reference 3, although the arrival angles of elevation and azimuth planes are estimated by the 2D-Unitary ESPRIT method, the delay time is estimated using a conventional channel counter, resulting in low time resolution and low precision.

SUMMARY OF THE INVENTION

It is an object of the present invention to provide a radio environment analysis apparatus capable of simultaneously estimating a combination of the arrival angles of elevation and azimuth planes and the delay time with high resolution and high precision.

It is another object of the present invention to provide a radio environment measurement apparatus applicable to even mobile communication.

To achieve the above objects, according to the present invention, there is provided a radio environment analysis apparatus comprising a receiver for receiving a signal modulated by phase shift keying (PSK) using a pseudo noise (PN) code sequence by an array antenna at a plurality of fixed points on a plane, converting the plurality of received signals into intermediate frequencies or demodulated signals, and outputting the resultant signals, and a signal processor for processing a signal output from the receiver to analyze an arrival angle, delay time, and relative power of the signal incoming to the receiver, the signal processor having a plurality of normalization means for individually normalizing respective signals from the receiver and outputting the normalized signals as a normalized signal group, first estimation means for calculating a covariance matrix from the signal group normalized by the normalization means, and estimating an arrival angle of each incoming signal using one of a 2D-MUSIC method and 2D-Unitary ESPRIT method, arithmetic means for calculating a weight of the array antenna for suppressing incoming signals except for an incoming signal having the arrival angle estimated by the first estimation means, and calculating a product of the calculated weight of the array antenna and the normalized signal group, and second estimation means for calculating a covariance matrix from a product signal group output from the arithmetic means, and estimating a delay time and relative power using one of the MUSIC method and ESPRIT method.

DESCRIPTION OF THE PREFERRED EMBODIMENTS

The present invention will be described in detail below with reference to the accompanying drawings.

Figure 1:
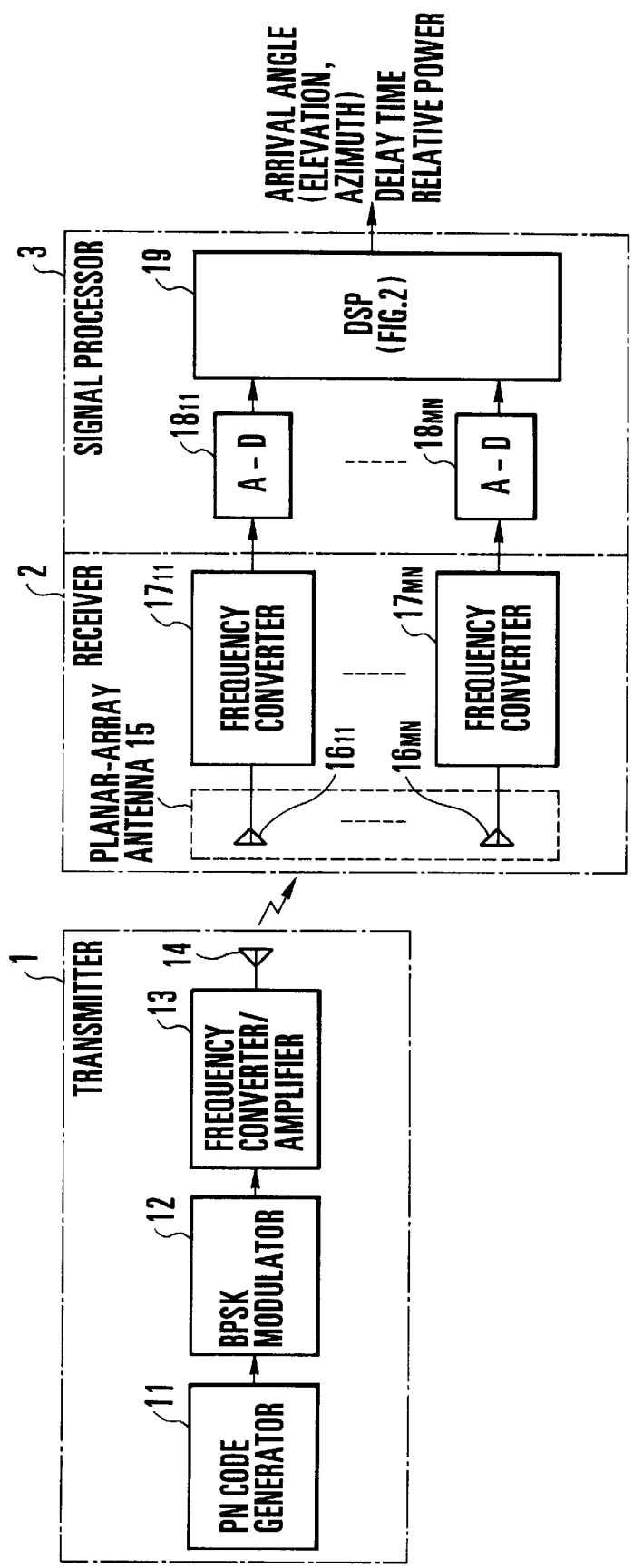
FIG. 1 is a block diagram showing a radio environment analysis apparatus according to the first embodiment of the present invention.

FIG. 1 shows a radio environment analysis apparatus according to the first embodiment of the present invention. In FIG. 1, the radio environment analysis apparatus comprises a transmitter 1 for transmitting a signal modulated by PSK (Phase Shift Keying) using a PN (Pseudo Noise) code sequence, a receiver 2 for outputting signals received by a plurality of antenna elements arrayed on the plane after conversion into intermediate frequencies or demodulated signals, and a signal processor 3 for simultaneously estimating a combination of the arrival angles (elevation and azimuth angles), delay time, and relative power of a reception signal on the basis of an output from the receiver 2.

The transmitter 1 is constituted by a PN code generator 11 for generating a PN code, a BPSK (Binary PSK) modulator 12 for phase-modulating the PN code output from the PN code generator 11, a frequency converter/amplifier 13 for converting the modulated signal output from the BPSK modulator 12 into a predetermined measurement frequency, and amplifying and outputting it, and a transmission antenna 14 for radiating the signal output from the frequency converter/amplifier 13 into the space.

The receiver 2 is constituted by a planar-array antenna 15 having M×N (M and N are integers equal to or larger than 2) antenna elements $16_{11}$ to $16_{MN}$ arrayed on the plane, and a plurality of frequency converters $17_{11}$ to $17_{MN}$ for outputting signals received by the antenna elements $16_{11}$ and $16_{MN}$ after conversion into intermediate frequencies or basebands.

The signal processor 3 is constituted by a plurality of A/D (Analog-to-Digital) converters (A-D) $18_{11}$ to $18_{MN}$ for digitally converting the frequency-converted reception signals from the frequency converters $17_{11}$ to $17_{MN}$, and a digital signal processor (DSP) 19 for simultaneously estimating a combination of the arrival angles (elevation and azimuth angles), delay time, and relative power of a signal incoming to the planar-array antenna 15 on the basis of the plurality of digital reception signals from the A/D converters $18_{11}$ to $18_{MN}$ and a criterion signal.

Signal processing operation of the DSP 19 will be explained with reference to FIG. 2.

Figure 2:
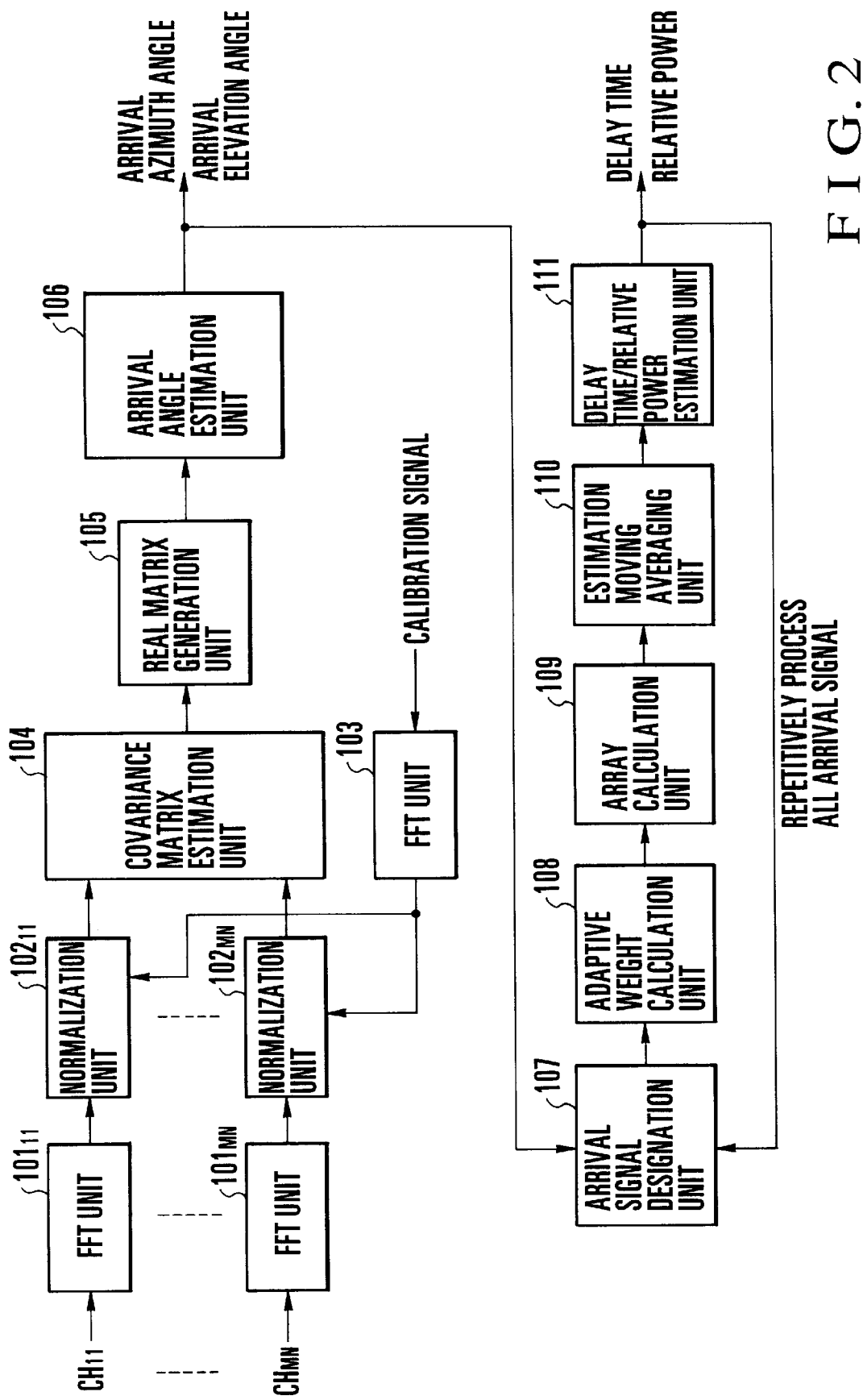
FIG. 2 is a block diagram showing signal processing operation of a DSP shown in FIG. 1.

In FIG. 2, a plurality of signals that are received by the antenna elements $16_{11}$ to $16_{MN}$ of the planar-array antenna 15 and digitally converted are transformed by fast Fourier transformers $101_{11}$ to $101_{MN}$. Then, the time-series signals are converted into signals in the frequency range. To resolve a plurality of correlative signals such as multipath signals for the delay time, a moving average must be calculated in the frequency range. In calculating the moving average, the spectrum must be flat in a target frequency range.

The group delay devices of the transmitter and receiver must be excluded from processing targets for waiting for reception.

For this purpose, in an FFT 103, a transmission signal is directly input to each channel of the receiver and subjected to fast Fourier transform. In normalization units $102_{11}$ to $102_{MN}$, reception signals converted into the frequency range are normalized by a calibration (criterion) signal from the FFT 103 that is converted into the frequency range.

The arrival angles (elevation and azimuth angles) can be estimated from a reception signal having a frequency unique to the planar-array antenna. In a covariance matrix estimation unit 104, a moving-averaged covariance matrix is estimated using the reception signals normalized to the center frequency of the band from the normalization units $102_{11}$ to $102_{MN}$.

Figure 3:
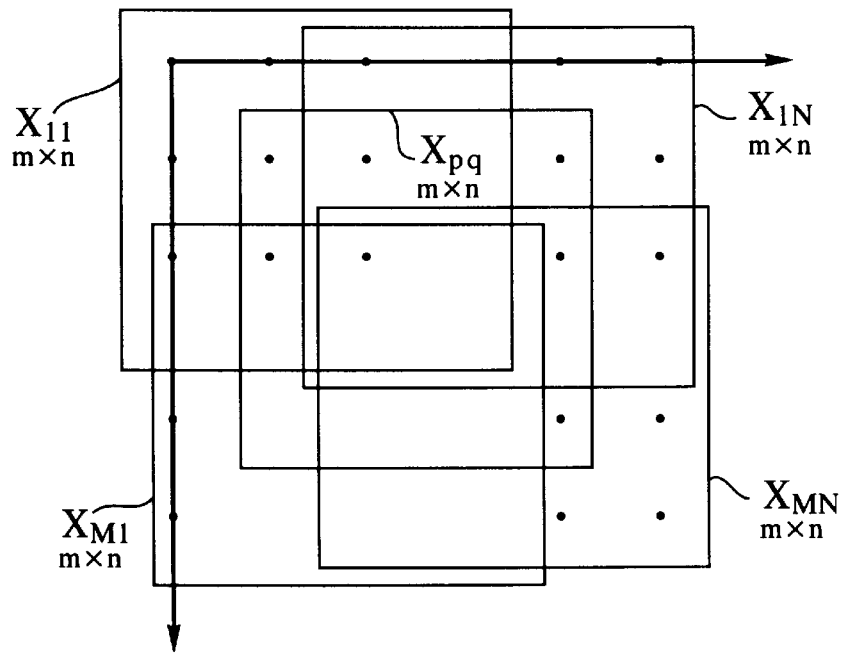
FIG. 3 is an explanatory view showing moving average calculation processing by the 2D-Unitary ESPRIT method.

FIG. 3 shows moving average calculation processing by the 2D-Unitary ESPRIT method.

In FIG. 3, a complex signal received by the planar-array antenna is divided into (M−m+1)×(N−n+1), m×n minor matrices $X_{pq}$. In general, m is (M+1)/2, and n is (N+1)/2. Each divided reception signal matrix $X_{pq}$ is vector-transformed as given by $$x_{pq} = vec(X_{pq}) \qquad (1)$$

to calculate a correlation matrix R defined by $$R_{pq} 32\ x_{pq} x^H_{pq} \qquad (2)$$

This operation is done for each divided minor matrix $X_{pq}$ to average a covariance matrix $R_{pq}$ by $$R = \frac{1}{(M-m+1)(N-n+1)} \sum_{p=1}^{M-n+1} \sum_{q=1}^{N-n+1} R_{pq} \qquad (3)$$

The averaged covariance matrix R is unitarily converted by $$Q^H_{mn} = RQ_{mn} \qquad (4)$$

where $Q^H_{mn} = Q^H_m \otimes Q^H_n$ $Q_{mn} = Q_m \otimes Q_n$

Qm: mth-order unitary matrix

Qn: nth-order unitary matrix

⊗: Kronecker's operator

That is, if m(n) is an even number (m(n)=2k: k is an integer), $$Q_{2k} = \frac{1}{\sqrt{2}} \begin{bmatrix} I_k & jI_k \\ II_k & -jII_k \end{bmatrix} \quad (4A)$$

If m(n) is an odd number (m(n)=2k+1), $$Q_{2k+1} = \frac{1}{\sqrt{2}} \begin{bmatrix} I_k & 0 & jI_k \\ 0^T & \sqrt{2} & 0^T \\ II_k & 0 & jII_k \end{bmatrix} \quad (4B)$$

where 0 is a 0 vector, $I_k$ is the kth-order unit matrix, and $II_k$ is defined by $$II_k = \begin{bmatrix} 0 & & 1 \\ & \ddots & \\ 1 & & 0 \end{bmatrix}$$

To increase resolution and precision, an ensemble average is calculated in a real matrix generation unit 105 by $$Ry = Re[E[Q^H_{mn} R Q_{mn}]] \quad (5)$$

where E[ ] is the ensemble average.
The real part of the covariance matrix is extracted.

An arrival angle estimation unit 106 estimates a combination of the arrival elevation and azimuth angles by the following procedure.

First, Ry is decomposed into eigenvalues, and the obtained eigenvalues $\lambda_i$ (i=11 to mn) are arranged in the decreasing order to be expressed by $$\lambda_1 \geq \lambda_2 \geq \ldots \geq \lambda_L \gg \lambda_{L-1} = \lambda_{mn} = \sigma^2 \quad (6)$$

where $\sigma^2$ is noise power.
From equation (6), the number L of arrival signals can be estimated from the distribution of the eigenvalues.

Then, a partial signal space $E_s$ to be defined is calculated by $$E_s = [e_1 e_2 \ldots e_L] \quad (7)$$

where ei is an eigenvector corresponding to the eigenvalue $\lambda_i$.

Matrices $E_\mu$ and $E_v$ to be defined are calculated by $$E_\mu = \begin{bmatrix} K_{\mu 1} E_S \\ K_{\mu 2} E_S \end{bmatrix}, E_v = \begin{bmatrix} K_{v 1} E_S \\ K_{v 2} E_S \end{bmatrix} \quad (8)$$

where $K_{\mu 1} = I_M \otimes K_1$, $K_{\mu 2} = I_M \otimes K_2$
$K_{v 1} = K_3 \otimes I_N$, $K_{v 2} = K_4 \otimes I_N$
$K_1 = Re[Q^H_{N-1} J_2 Q_N]$, $K_2 = Im[Q^H_{N-1} J_2 Q_N]$
$K_3 = Re[Q^H_{M-1} J_2 Q_M]$, $K_4 = Im[Q^H_{M-1} J_2 Q_M]$
$I_M$: Mth-order unit matrix
$I_N$: Nth-order unit matrix
$J_2$: selection matrix for extracting the Mth or Nth order from the second row of the matrix
A matrix $E_{XY}$ to be defined is calculated by $$E_{XY} = [K_{\mu 1} E_S | K_{\mu 2} E_S] \quad (9)$$

Further, a matrix:

$$E_{XY}^H E_{XY} = \begin{bmatrix} (K_{\mu 1} E_S)^H \\ (K_{\mu 2} E_S)^H \end{bmatrix} [K_{\mu 1} E_S | K_{\mu 2} E_S] \quad (10)$$

is calculated and decomposed into eigenvalues.
A matrix E is calculated by arranging the obtained eigenvectors $e_i$ (i=1 to 2L) by $$E = [e_1 e_2 \ldots e_{2L}] \quad (11)$$

The matrix E is divided into four L×L matrices by $$E = \begin{bmatrix} E_{11} & E_{12} \\ E_{12} & E_{22} \end{bmatrix} \quad (12)$$

A matrix $\Psi_\mu$ is calculated by $$\Psi_\mu = -E_{12}[E_{22}]^{-1} \quad (13)$$

Subsequently, this processing using equations (9) to (13) is repetitively executed for $E_v$ to define a matrix $\Psi_v$ corresponding to the matrix $\Psi_\mu$. $\Psi_\mu + j\Psi_v$ is decomposed into eigenvalues. Letting the obtained eigenvalue be $\omega_\mu(i) + j\omega_v(i)$ (i=1 to L), an arrival elevation angle $\theta_i$ and azimuth angle $\phi_i$ can be obtained by solving simultaneous equations:

$$\omega_\mu(i) = \frac{2\pi}{\lambda} \Delta x \cos\theta_i \cos\phi_i \quad (14)$$

$$\omega_v(i) = \frac{2\pi}{\lambda} \Delta y \cos\theta_i \sin\phi_i$$

where $\Delta x$ and $\Delta y$ are array element intervals and $\lambda$ is the wavelength of a transmission signal.

In this way, the arrival azimuth and elevation angles of L arrival signals can be obtained.

After that, the delay time and relative power are obtained.

An arrival signal designation unit 107 designates arbitrary one of the L detected arrival signals. An adaptive weight calculation unit 108 stores the designated signal to calculate the weight of the adaptive antenna for suppressing other unnecessary signals.

Letting $S_u$ be the covariance matrix and a(ø, θ) be a steering vector indicating the direction of the stored signal when an unnecessary signal is received by the array antenna, the weight of the adaptive antenna is calculated by $$W = \mu S_u a^*(\phi, \theta) \quad (15)$$

An array calculation unit 109 calculates the product of the array reception data and weight by $$y = W^H X \quad (16)$$

At this time, the product is calculated for a complex reception signal having a plurality of frequencies normalized in the frequency range. If J data are used in the frequency range, array outputs y(1) to y(J) are obtained. Using the array output data y(1) to y(J), an estimation moving averaging unit 110 calculates a correlation matrix S by $$S = YY^H \quad (17)$$

where $Y = [y(1) \ldots y(J)]^T$

Figure 4:
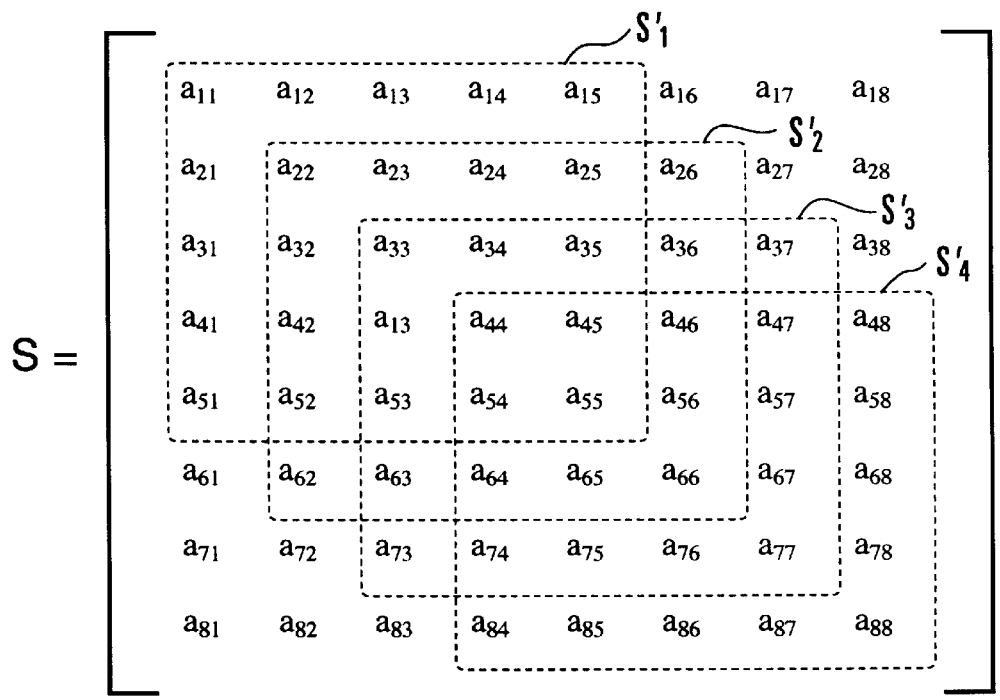
FIG. 4 is an explanatory view showing a moving average calculation method using the MUSIC method.

To resolve correlative signals for the delay time, moving averaging shown in FIG. 4 is done for the calculated correlation matrix. FIG. 4 shows a moving average calculation method using the MUSIC method for J=8. The correlation matrix S after moving average calculation is decomposed into eigenvalues, and the obtained eigenvalues are arranged in the decreasing order to be expressed by $$\lambda_1 \geq \lambda_2 \geq \ldots \geq \lambda_d >> \lambda_{d+1} = \lambda_J = \sigma^2 \quad (18)$$

From equation (18), the number d of arrival waves can be estimated.

Then, J–d eigenvectors corresponding to eigenvalues equal to noise power are extracted to calculate a MUSIC spectrum P(t) by $$P(t) = \sum_{i=d+1}^{J} \frac{1}{a^H(\tau) e_i e_i^H a(\tau)} \quad (19)$$

where $a(\tau) = [e^{-j\omega_1 \tau}, \ldots, e^{-j\omega_J \tau}]^T$ $\omega_1 \ldots \omega_J$: frequencies in use In this evaluation function, a point exhibiting a sharp peak is an estimate of the delay time. The relative power is given by $$P = (A^*A)^{-1} A^*(S - \sigma^2 I) A (A^*A)^{-1} \quad (20)$$

where $A = [a(\tau_1), \ldots, a(\tau_d)]$

I: unit matrix

Finally, a delay time/relative power estimation unit 111 calculates an estimate of power from the diagonal term of the matrix P. Note that processing from the arrival signal designation unit 107 to the delay time/relative power estimation unit 111 is repetitively executed for all arrival angles of sequentially extracted signals having arrival angles estimated by the arrival angle estimation unit 106.

In the first embodiment, processing of the arrival angle estimation unit 106 and processing of the relative power estimation unit 111 respectively employ an algorithm based on the 2D-Unitary ESPRIT method and an algorithm based on the MUSIC method. Instead, the arrival angle estimation unit 106 and relative power estimation unit 111 may respectively employ the 2D-MUSIC method and ESPRIT method.

Figure 5:
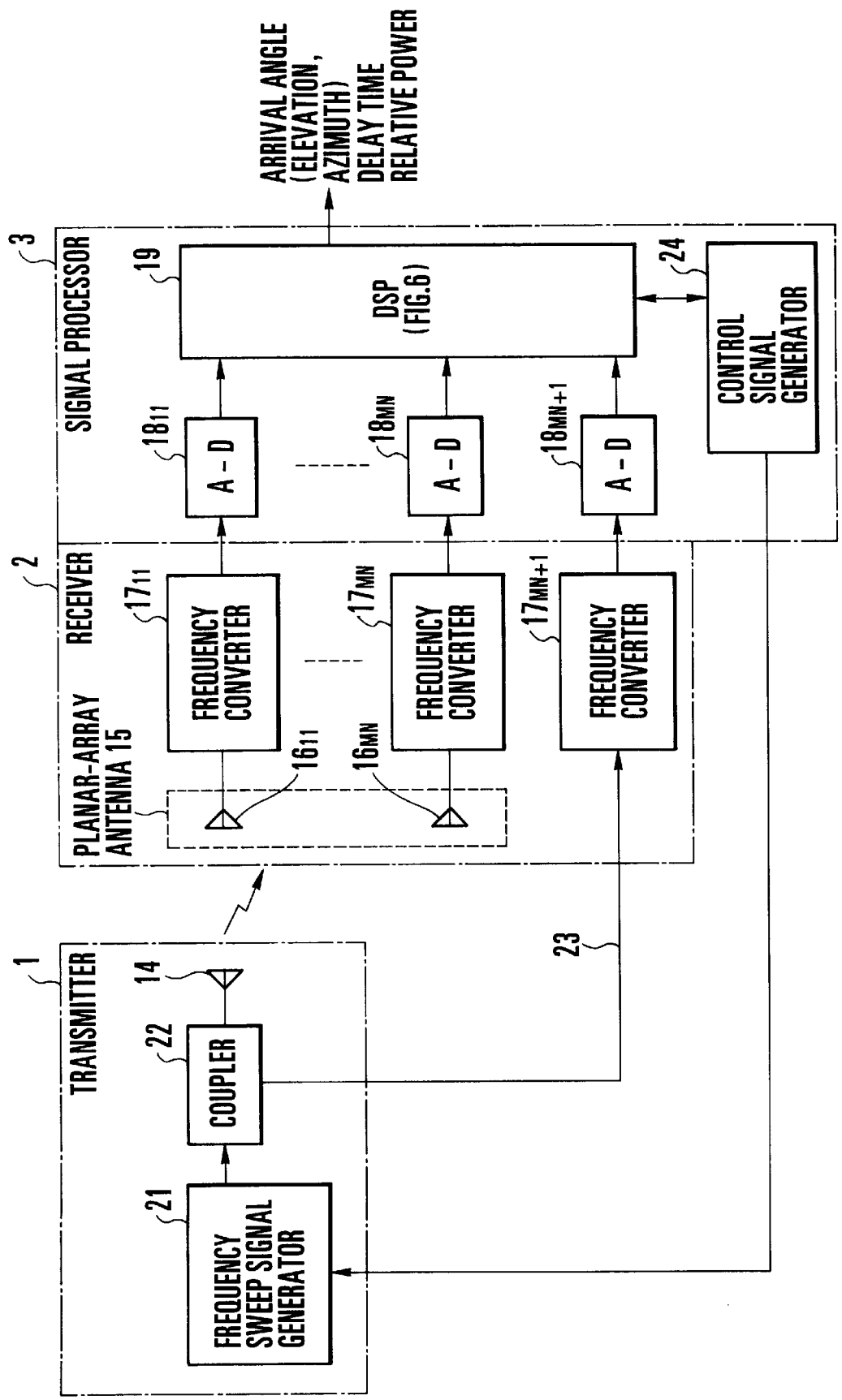
FIG. 5 is a block diagram showing a radio environment analysis apparatus according to the second embodiment of the present invention.

FIG. 5 shows a radio environment analysis apparatus according to the second embodiment of the present invention.

In FIG. 5, a transmitter 1 comprises a frequency sweep signal generator 21 for generating a frequency sweep signal as a transmission signal. The transmission frequency from the transmitter 1 changes within a predetermined band by the frequency sweep signal generator 21 under the control of a signal processor 3.

Part of the transmission signal is extracted by a coupler 22 and sent to a receiver 2 via a cable 23. The receiver 2 additionally comprises a frequency converter 17$_{MN+1}$ for converting the transmission signal input via the cable 23 into an intermediate frequency or demodulated signal, similar to an array antenna reception signal, and outputting the converted signal to the signal processor. The signal processor 3 comprises a control signal generator 24 controlled by a DSP 19 in order to change the transmission signal frequency of the transmitter 1 within a predetermined band.

Signal processing operation of the DSP 19 shown in FIG. 6 will be explained.

Transmission and array antenna reception signals frequency-converted by the receiver 2 are transformed by discrete Fourier transformers (DFTs) 112$_{11}$ to 112$_{MN}$ to obtain the amplitudes and phases. The amplitudes and phases of the transmission and array antenna reception signals are normalized in normalization units 102$_{11}$ to 102$_{MN}$.

The subsequent processing procedure is basically the same as in the first embodiment (see FIG. 2). Note that estimating the delay time requires array antenna reception signals having a plurality of frequencies. Hence, array outputs having a plurality of frequencies are calculated in place of the transmission frequency in order to perform processing of an array calculation unit 109.

The second embodiment requires the connection cable 23 between the transmitter 1 and receiver 2, and thus is applicable to a static or quasi-static system such as an indoor radio LAN (Local Area Network).

Figure 7:
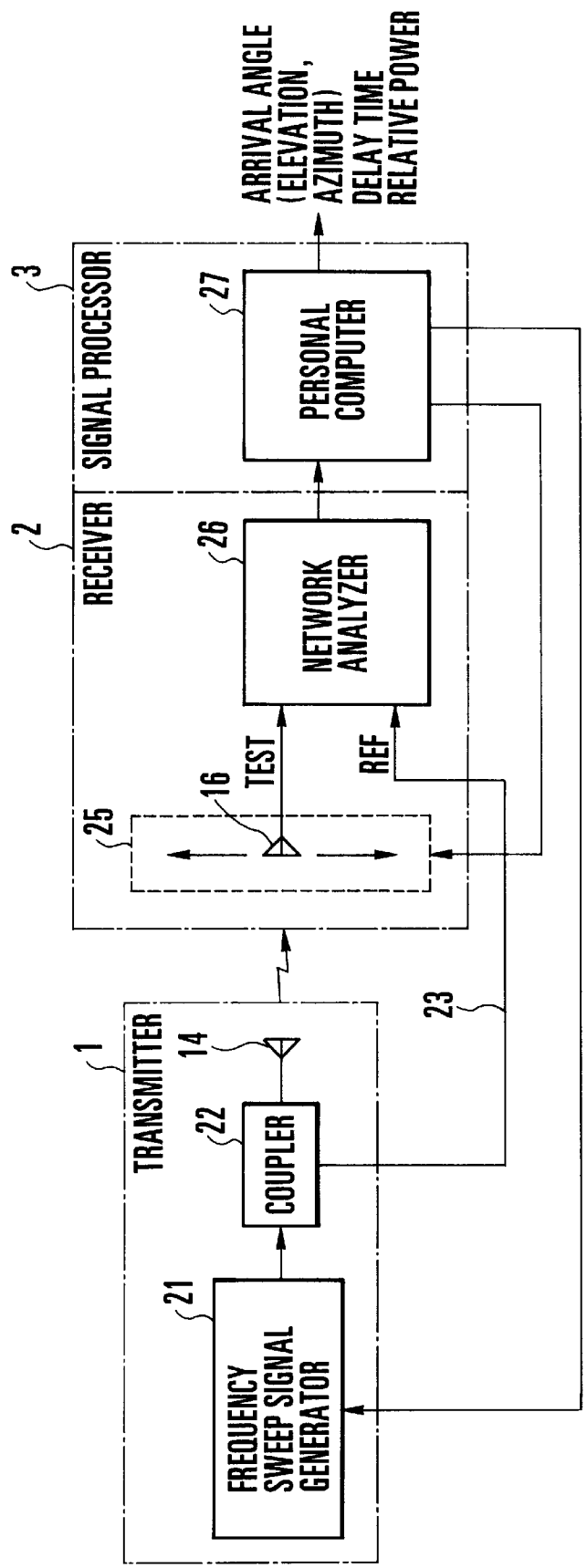
FIG. 7 is a block diagram showing a radio environment analysis apparatus according to the third embodiment of the present invention.

A radio environment analysis apparatus according to the third embodiment of the present invention will be described with reference to FIG. 7. In the third embodiment, the present invention is directly applied to hardware used in the above-described references 1 and 4. That is, a receiver 2 comprises a scanner 25 and network analyzer 26, whereas a signal processor 3 comprises a personal computer 27.

As a transmission signal, a frequency sweep signal generated by a frequency sweep signal generator 21 is used. The transmission frequency sequentially changes within a predetermined band under the control of the personal computer 27 in order to estimate the delay time. Part of the transmission signal is extracted by a coupler 22, input to the network analyzer 26 via a cable 23, and used as a reference signal.

A single antenna element 16 is attached to the scanner 25 and controlled by the personal computer 27 so as to sequentially move to alignment positions of the array antenna. The third embodiment obtains an array antenna reception signal necessary for estimating the arrival elevation and azimuth angles by spatial movement of the antenna element 16.

Figure 6:
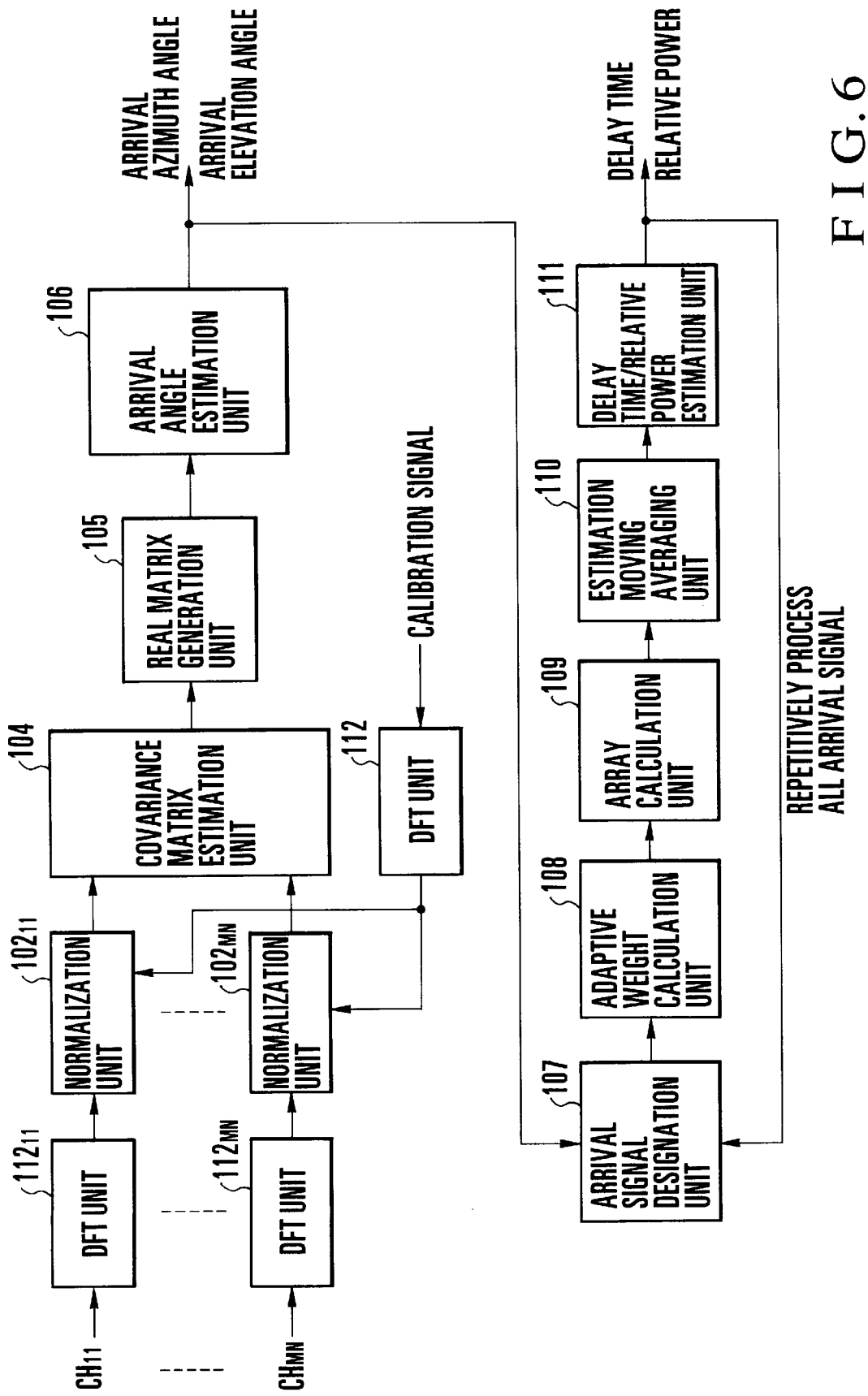
FIG. 6 is a block diagram showing signal processing operation of a DSP shown in FIG. 5.

The subsequent processing procedure is the same as in the second embodiment (see FIG. 6). Note that since the third embodiment adopts the network analyzer 26, the DFTs 112$_{11}$ to 112$_{MN}$ and normalization units 102$_{11}$ to 102$_{MN}$ used to normalize the reception signal can be eliminated. The delay time is estimated using a measurement value prepared by calibrating the frequency characteristics of the network analyzer 26.

As has been described above, the present invention can estimate not only the arrival azimuth angle but also the arrival elevation angle, the delay time, or the propagation parameter of relative power at the same time with high resolution and high precision. Further, the present invention can provide a radio environment analysis apparatus applicable to even mobile communication without requiring any connection cable between communication stations and any mechanical movement of the antenna element.

The basic processing of the present invention can also be applied to hardware requiring the connection cable between communication stations and mechanical movement of the antenna element.

What is claimed is:

1. A radio environment analysis apparatus comprising:
   a receiver for receiving a signal modulated by phase shift keying (PSK) using a pseudo noise (PN) code sequence by an array antenna at a plurality of fixed points on a plane, converting the plurality of received signals into intermediate frequencies or demodulated signals, and outputting the resultant signals; and a signal processor for processing a signal output from said receiver to analyze an arrival angle, delay time, and relative power of the signal incoming to said receiver, said signal processor having:

a plurality of normalization means for individually normalizing respective signals from said receiver and outputting the normalized signals as a normalized signal group;

first estimation means for calculating a covariance matrix from the signal group normalized by said normalization means, and estimating an arrival angle of each incoming signal using one of a 2D-MUSIC method and 2D-Unitary ESPRIT method;

arithmetic means for calculating a weight of said array antenna for suppressing incoming signals except for an incoming signal having the arrival angle estimated by said first estimation means, and calculating a product of the calculated weight of said array antenna and the normalized signal group; and second estimation means for calculating a covariance matrix from a product signal group output from said arithmetic means, and estimating a delay time and relative power using one of the MUSIC method and ESPRIT method.

2. An apparatus according to claim 1, wherein said array antenna comprises a plurality of antenna elements arrayed on the plane, and said normalization means normalizes respective outputs from said plurality of antenna elements.

3. An apparatus according to claim 1, wherein said array antenna comprises one antenna element moving through fixed points on the plane, and said normalization means normalizes respective outputs from said antenna element at the fixed points.

4. An apparatus according to claim 1, wherein said normalization means performs Fourier transform for a signal from said receiver and normalizes the signal with the same spectrum as a transmission signal.

5. An apparatus according to claim 1, wherein said apparatus further comprises a transmitter for transmitting a signal PSK-modulated using a PN code sequence, and said normalization means normalizes the signal from said receiver by a frequency sweep signal supplied from said transmitter.

6. An apparatus according to claim 1, wherein said first estimation means estimates a combination of arrival elevation and azimuth angles as an arrival angle of an incoming signal, and said arithmetic means stores information of the incoming signal having the arrival elevation and azimuth angles estimated by said first estimation means, and calculates a weight of said array antenna for suppressing other incoming signals in accordance with the storage result.

7. An apparatus according to claim 1, wherein said signal processor stores each incoming signal and calculates a weight for suppressing other incoming signals to calculate a normalized signal group and product for all incoming signals having estimated arrival angles, and calculates a delay time and relative power from a covariance matrix of the obtained product signal group to estimate a combination of the arrival angles, delay times, and relative powers of all signals incoming to said receiver.

* * * * *